Oct. 20, 1959 R. O. BATES 2,909,381
CLAMP FOR STRUCTURAL ELEMENTS
Original Filed Feb. 7, 1955

ROBERT O. BATES,
INVENTOR.

HUEBNER, BEEHLER,
WORREL & HERZIG,
ATTORNEYS.

United States Patent Office 2,909,381
Patented Oct. 20, 1959

2,909,381

CLAMP FOR STRUCTURAL ELEMENTS

Robert O. Bates, Los Angeles, Calif., assignor of one-half to Gene W. Arant, Los Angeles, Calif.

Continuation of application Serial No. 486,344, February 7, 1955. This application September 19, 1958, Serial No. 762,677

3 Claims. (Cl. 287—54)

This application refers to hardware items in general and has particular reference to a clamp which is capable of securing a tight, firm grip on rather smooth, hard, cylindrical exteriors. This application is a continuation of my copending application Serial No. 486,344, filed February 7, 1955, now abandoned.

In the hardware art relatively little improvement has been experienced in the design of clamps for fastening or bolting parts together. U clamps have been used for so many years to provide fastening means for rods and shafts that their construction as standard equipment has been taken for granted. There are, however, very definite limitations in the applicability of U clamps to all uses. These clamps are defective in that even though screwed very tightly upon a shaft or tube, they can be rotated out of position. Frequently when the structural element is a tube, they are fastened so tightly that the tube is deformed in order to hold them in place. If the structural element happens to be a solid shaft, no amount of tightening will make them completely secure. Not only are they apt to rotate, but they also can be slid lengthwise out of position. In many instances a clamp of this kind is not usable where any misadjustment or misalignment cannot be tolerated.

Other expedients consisting of the use of set screws or indentations or other configuration on the structural member itself cannot always be resorted to.

It is therefore among the objects of the invention to provide a new and improved clamp for structural elements particularly those which have a hard, cylindrical, exterior wall.

Another object of the invention is to provide a new and improved clamp which can be fastened tightly on a structural element having a smooth cylindrical exterior without the application of an undue amount of pressure.

Still another object of the invention is to provide a new and improved clamp particularly well adapted for use on structural members having a cylindrical exterior whereby the clamp can be conveniently assembled when being attached and conveniently disassembled when being detached, all without deformation or damage to any parts of the clamp.

Still further among the objects of the invention is to provide a new and improved clamp for structural members of the type already referred to which is of very simple character and which can be produced at relatively a minimum cost.

With these and other objects in view, the invention consists in the construction, arrangement and combination of the various parts of the device whereby the objects contemplated are attained, as hereinafter set forth, pointed out in the appended claims and illustrated in the accompanying drawing.

Figure 1:
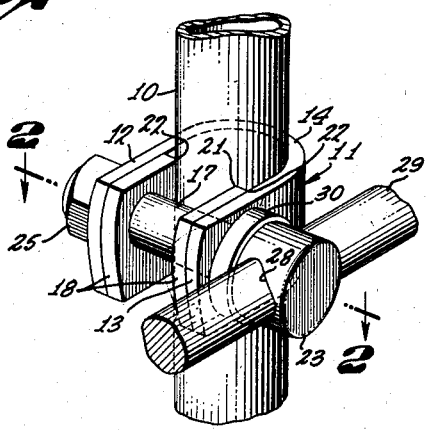
Figure 1 is an elevational perspective view showing the clamp of the invention applied to a tube.
Figure 2:
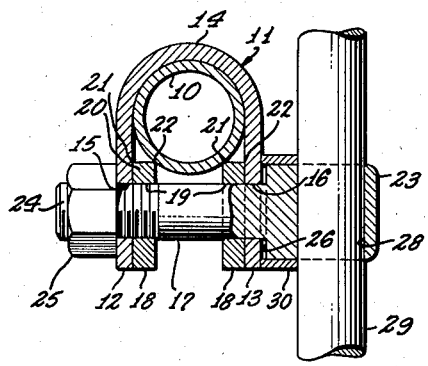
Figure 2 is a cross sectional view taken on the line 2—2 of Figure 1.

In the form of the invention illustrated in Figures 1 and 2 there is shown a structural element 10 here having a tubular form but which more particularly is made of some particularly hard material such as steel and which has a smooth or even polished or plated exterior wall of continuously uniform diameter.

The clamp of the invention consists of a substantially U-shaped strap 11 having legs 12 and 13 extending beyond the tube. A curved portion 14 surrounds and engages approximately one-half of the circumference of the tube and, if not in exact conformance with the circumference, can be drawn into conformance as the clamp is tightened in place.

The legs 12 and 13 near the ends are provided with holes 15 and 16, respectively, these holes being in alignment with each other. Moreover, the holes are spaced far enough from the curved portion 14 so that a bolt 17 will entirely clear the nearest part of the wall of the tube 10.

On each side and adjacent the inner face of the respective legs 12, 13 there is provided a gripping plate or shoe 18 which has a hole 19 adapted to receive the bolt 17. In the particular embodiment selected the shoe has a thickness equal to about one-seventh the diameter of cylindrical member 10. As a result, there is a reasonable amount of metal at the portion 20 of the shoe so that there will be no deformation of the shoe in this area when the clamp is tightened upon the structural member.

Each shoe is provided with two clean, firm, corner edges 21 and 22. Thus constructed the shoes are reversible as well as interchangeable.

The bolt 17 already referred to has a head 23 and threaded end 24 at which end is a nut 25. The head 23 has a shoulder 26 and also is provided with an aperture 28 adapted to receive a shaft 29 with a free sliding fit.

In this particular embodiment there is provided a sleeve 30 surrounding the head 23 of the bolt between the outside of the leg 13 and the adjacent side of the shaft 29. Constructed in this fashion the bolt serves a double purpose.

When the clamp is to be tightened upon the tube the strap 11 is slid into a proper position and the bolt extending through the holes 15, 16 and both holes in the shoes, is tightened in place. As the tightening progresses the edges of the shoe which lie in contact with the exterior of the tube are drawn sharply into engagement with the exterior tube wall. By reason of these edges being clean corners, they provide a very tight grip on the tube without it being necessary to unduly tighten the nut 25 upon the bolt.

Simultaneously the bolt head pulls in a direction from right to left as viewed in Figure 2, pressing the shaft 29 against the sleeve 30, the sleeve in turn being backed by engagement against the exterior of the leg 13. It will become apparent, therefore, that the shaft 29 is anchored in any selected position of rotation at the same time that the strap is clamped upon the tube. Clearly also the shaft may be rotated to any position within a 360-degree arc before it is tightened in place. Once tightened the shaft and the tube are firmly fixed in their adjusted relationships. Once tightened, because of the very firm grip of the corners of the shoe on the tube, the clamp cannot be displaced except perhaps by an extreme and unnecessarily great blow or other disturbance.

From mathematical analysis it will be apparent that if corner edges 21, 22 are to engage member 10 exactly normal to its surface, then the gripping edges will lie 90° apart on the surface of the member, assuming an exact U-configuration of strap 11. Also, the thickness of shoes 18 will be one-seventh the diameter of member 10.

Figure 3:
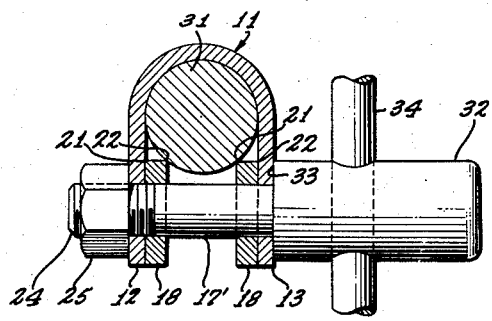
Figure 3 is a cross sectional view of a second and more simplified form of the device.

In the form of the invention illustrated in Figure 3 the principal parts remain the same, namely, the strap 11 having legs 12 and 13 enclosing between them the shoes 18. Purely by way of example the structural element is shown as a solid cylindrical bar 31.

In this form of the device a bolt 17 has a slightly different form in that a head 32 of the bolt is constructed with a shoulder 33 adapted to engage directly against the exterior surface of the leg 13. A pin 34 or other appropriate element may be positioned in the head 32 and there secured by some conventional means.

When the clamp in this form is tightened up by rotation of the nut 25 on the threaded end of the bolt 17', the shoulder 33 is drawn against the leg 13 as the bolt is drawn against the leg 12. These two opposite pressures will force the edges 21 and 22 of the shoes into tight frictional engagement with the exterior of the bar 31 and will effectively anchor the clamp in place against both longitudinal and rotational disturbances.

There has therefore been described a very simple form of clamp which can be effectively used upon structural elements having a cylindrical exterior regardless of how hard the structural element might be. Because of the lightness of pressure required to firmly anchor the clamp in place, the structural element may also be of light, soft consistency, such as copper tubing, or even plastic tubing, as well as being of heavier harder material. In either event the clamp may be firmly and accurately anchored without likelihood of disturbance.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

I claim:

1. A clamp for removably gripping a member having a smooth, hard cylindrical exterior surface, said clamp comprising: a substantially U-shaped strap having legs adapted to extend beyond the surface of said member and having aligned holes formed in their projecting portions; a bolt adapted to extend through said holes in said strap and having a nut threadedly mounted thereon adapted when tightened to squeeze said legs of said strap together; and a pair of removable gripping plates each adapted to be in longitudinal engagement with the inner surface of a corresponding projecting leg portion of said strap, each of said gripping plates having a hole formed therein adapted to receive said bolt, and each having a rectangular end whose corner edge not in contact with said strap is adapted to frictionally engage the surface of the member.

2. A clamp capable of securing a tight, firm grip on a member having a smooth, hard cylindrical exterior surface, and of being conveniently attached to or removed from the member, said clamp comprising: a U-shaped strap whose inner diameter near the bottom of the U is substantially equal to the diameter of the surface of the member, with the legs thereof being adapted to project beyond the surface of said member and having aligned holes formed in their projecting portions; a bolt adapted to extend through said holes in said strap and having a nut threadedly mounted thereon adapted when tightened to squeeze said legs of said strap together; and a pair of removable gripping plates adapted to lie in longitudinal engagement with the inner surfaces of corresponding projecting leg portions of said strap, each of said gripping plates having a rectangular end whose corner edge not in contact with said strap extends substantially the full width thereof and is adapted to frictionally engage the surface of the member, each of said gripping plates having a hole formed therein adapted to receive said bolt, with the thickness of said plates and the lengths of said strap legs and of said plates measured from the respective holes therein toward the bottom of the U being such that when said gripping plates are so positioned said corner edges thereof lie approximately 90° apart on the surface of the member, and each of said corner edges engages said surface substantially normally thereto.

3. A clamp for structural elements having cylindrical exterior walls of uniform diameter comprising a substantially U-shaped strap with legs thereof adapted to extend beyond the wall of the structural element and having aligned holes adjacent the ends of the legs, removable gripping shoes having corner edges substantially as long as the width of the strap adapted to lie against and engage the wall of the structural element in a direction parallel to the axis thereof, said shoes having holes comparable in size to the holes in the strap, a bolt adapted to extend through the holes in the strap and the shoes and a nut on said bolt adapted when tightened to squeeze the legs of the strap together and to force said corner edges into frictional engagement with the structural element, a head on said bolt, said bolt head having means adapted to mount a second structural element in any one of a number of different altitudes of rotation relative to the first-identified structural element, and a lock element between the adjacent leg and the second structural element adapted to fix said second structural element in position when the nut is tightened on the bolt.

References Cited in the file of this patent

UNITED STATES PATENTS

| | | |
|---|---|---|
| 575,631 | Brooks | Jan. 19, 1897 |
| 713,832 | Bailey | Nov. 18, 1902 |
| 1,225,301 | Wolfe | May 8, 1917 |
| 1,300,328 | Berg | Apr. 15, 1919 |
| 1,705,223 | McLean | Mar. 12, 1929 |
| 2,777,657 | Zent | Jan. 15, 1957 |